United States Patent
Hauber

(10) Patent No.: US 11,760,038 B2
(45) Date of Patent: Sep. 19, 2023

(54) OPTIMIZED RIB-STIFFENED COMPOSITE STRUCTURE

(71) Applicant: Trelleborg Sealing Solutions Germany GmbH, Stuttgart (DE)

(72) Inventor: David Edgar Hauber, Troy, NY (US)

(73) Assignee: Trelleborg Sealing Solutions Germany GmbH, Stuttgart (DE)

(*) Notice: Subject to any disclaimer, the term of this patent is extended or adjusted under 35 U.S.C. 154(b) by 0 days.

(21) Appl. No.: 17/647,256

(22) Filed: Jan. 6, 2022

(65) Prior Publication Data

US 2022/0219408 A1     Jul. 14, 2022

Related U.S. Application Data

(60) Provisional application No. 63/135,437, filed on Jan. 8, 2021.

(51) Int. Cl.
*B32B 3/12*     (2006.01)
*B29C 70/08*    (2006.01)
(Continued)

(52) U.S. Cl.
CPC .......... *B29C 70/086* (2013.01); *B29C 70/081* (2013.01); *B29C 70/46* (2013.01); *B29C 70/50* (2013.01); *B32B 3/12* (2013.01); *B32B 5/02* (2013.01); *B32B 5/12* (2013.01); *B32B 5/18* (2013.01); *B32B 5/245* (2013.01); *B32B 5/26* (2013.01); *B32B 27/065* (2013.01); *B32B 27/08* (2013.01); *B32B 27/12* (2013.01); *B32B 27/288* (2013.01); *B29K 2101/12* (2013.01);
(Continued)

(58) Field of Classification Search
CPC .... B32B 3/12; B32B 5/02; B32B 5/12; B32B 5/18; B32B 5/245; B32B 2260/021; B32B 2260/046
See application file for complete search history.

(56) References Cited

U.S. PATENT DOCUMENTS 4,052,523 A * 10/1977 Rhodes .................... B32B 7/12
                                                    428/116
4,086,378 A     4/1978 Kam et al.
(Continued)

OTHER PUBLICATIONS

Chakka, Venkata Sandeep, "Quasi-Static and Impact Characterization of Sandwich Structures with an Iso-Grid Stiffened Syntactic Foam Core" (2008). LSU Master's Theses. 3424. https://digitalcommons.lsu.edu/gradschool_theses/3424.

*Primary Examiner* — David Sample
*Assistant Examiner* — Donald M Flores, Jr.
(74) *Attorney, Agent, or Firm* — Orbit IP

(57) ABSTRACT

A rib-stiffened composite structure includes a composite face sheet having a continuous reinforcing fiber in a polymer matrix. A polymer core is in a grid pattern disposed on the composite face sheet, the grid pattern having a first series of paths crossing over a second series of paths. Material voids are formed in the spaces between the series of paths. A composite rib-cap is disposed upon an upper surface of the polymer core. The composite rib-cap includes a continuous reinforcing fiber in a polymer matrix. The fibers of the continuous reinforcing fiber of the polymer matrix of the composite rib cap are oriented in a direction along the first and second series of paths of the grid pattern of the extruded polymer core.

15 Claims, 6 Drawing Sheets

(51) Int. Cl.
*B29C 70/50* (2006.01)
*B29C 70/46* (2006.01)
*B32B 5/12* (2006.01)
*B32B 5/18* (2006.01)
*B32B 27/12* (2006.01)
*B32B 27/08* (2006.01)
*B32B 27/28* (2006.01)
*B32B 27/06* (2006.01)
*B32B 5/26* (2006.01)
*B32B 5/02* (2006.01)
*B32B 5/24* (2006.01)
*B29K 101/12* (2006.01)

(52) U.S. Cl.
CPC . *B29K 2995/0094* (2013.01); *B32B 2260/021* (2013.01); *B32B 2260/046* (2013.01); *B32B 2262/101* (2013.01); *B32B 2262/106* (2013.01); *B32B 2266/08* (2013.01)

(56) References Cited

U.S. PATENT DOCUMENTS

| | | |
|---|---|---|
| 7,479,201 B1 | 1/2009 | Wegner et al. |
| 9,850,660 B2 | 12/2017 | Li et al. |
| 2006/0116040 A1 | 6/2006 | Yun et al. |
| 2013/0020013 A1* | 1/2013 | Shimohara .............. B29C 65/62 156/93 |
| 2014/0150363 A1 | 6/2014 | Wilson et al. |
| 2018/0272645 A1 | 9/2018 | Pavlov et al. |

* cited by examiner

OPTIMIZED RIB-STIFFENED COMPOSITE STRUCTURE

CROSS-REFERENCE TO RELATED APPLICATIONS

This application claims priority to provisional application 63/135,437 filed on Jan. 8, 2021, the entire contents of which are hereby incorporated in full by this reference.

DESCRIPTION

Field of the Invention

The present invention relates generally to structures, and the manufacturing methods thereof, which have high specific strength and stiffness. More specifically, the present invention relates to a grid-stiffened composite structure utilizing a novel method for manufacture.

Background of the Invention

Grid-stiffened structures such as isogrids and orthogrids are well understood as a means to reduce weight in structures. It is a common approach to reduce weight by molding or machining isotropic materials, such as metal, to create rib-like features. However, complex molding or machining away large portions of a structure is expensive. It is well understood within the state of the art that structural efficiency is further improved with the use of advanced composite materials.

Advanced composite materials, which have high specific strength and stiffness (the strength or modulus divided by density), improve structural performance. Advanced composite materials add an additional level of complexity as these materials are typically expensive and it is difficult to place them in the direction of the load paths especially on complex surfaces. New technologies such as AFP (Automated Fiber Placement) and AM (Additive Manufacturing) are improving the manufacturing of complex structures. However, these new technologies have not been able to address the economical manufacture of grid-stiffened structures. The basic problem is the continuous fiber composites cross over each other at the nodes which increases the thickness at the nodes which in turn increases the panel thickness and reduces structural efficiency. It is possible to cut each strip and restart a new strip at the nodes, but this is time consuming and error prone.

It is well known within the state of the art that structural efficiency can be improved with the use of stiffened-skin structures where a lightweight core is sandwiched between layers of advanced composite materials. This approach maximizes the specific strength and stiffness of the structure by increasing the section modulus as in an I-beam. However, the encapsulated core is prone to absorb moisture which can lead to delamination and failure of the structure (for example an aircraft that takes off in high humidity and goes to high altitude causing the water vapor to expand between the composite skins). Typical core materials are honeycomb or polymer foam.

It is also known within the state of the art to create an isogrid structure which includes a foam core. For example, the thesis "Quasi-Static and Impact Characterization of Sandwich Structures with an Iso-Grid Stiffened Syntactic Foam Core", 2008, LSU Masters Thesis, discusses filling preformed bays with a foam core.

The challenge has been economically manufacturing grid-stiffened structures using advanced composites.

What is needed in the art is a way to optimize the structural performance of grid-stiffened structures at the lowest material, manufacturing, and life cycle cost.

SUMMARY OF THE INVENTION

The invention provides innovative and optimized grid-stiffened structures and methods to economically manufacture these structures. Instead of filling the bays with a foam core, the invention incorporates the core in the rib structure itself.

The invention relates to structures that requires high specific strength and/or stiffness. Such applications include satellites, launch vehicles, vertical flight, aircraft, ground transportation, surface vessels and submersibles roughly in order of importance. The rule of thumb is that a pound of weight saved is worth $10,000/lb for satellites, $1,000/lb for vertical flight, $100/lb for aircraft, and $10/lb for ground transportation. Such vast scales call for suitable technologies to address these economic constraints. The current invention addresses all these scales with different materials and processes but with the same innovative use of these materials and processes.

Definitions: As used herein, advanced composites refers to the combination of continuous fibers such as carbon fibers and a matrix such as polymer. AFP refers to automated fiber placement, an industry standard composite processing method. AM refers to additive manufacturing, processes that build structures by adding material (as opposed to subtractive processes like machining). Orthogrid refers to a grid-stiffened structure with generally rectangular openings for properties primarily in two directions. Isogrid refers to a grid-stiffened structure with generally triangular openings for properties primarily in three directions as in isotropic materials. Anisogrid refers to a grid-stiffened structure with generally different openings for differing properties in all directions, for example on a cone or complex surface. Chopped fiber refers to fiber reinforcement that is chopped into short lengths, on the order of millimeters, so that it can be more easily formed into complex shapes. CNC refers to Computer Numerical Control, automated machining. Face sheet refers to, for the purpose of this innovation, a continuous fiber reinforced composite surface which can be planar or a complex shape. FFF refers to fused filament fabrication, an additive manufacturing process that fuses an extruded bead to form a structure. MEX refers to material extrusion, a more general additive manufacturing process that includes FFF. Grid-stiffened structures refers to a face sheet supported by a lattice pattern of raised rib stiffeners. HGM refers to hollow glass microspheres, typically 10 to 300 micrometer diameter. Isogrid refers to an isotropic grid-stiffened structure. Isotropic refers to properties in all directions. Node refers to a crossover point in a grid-stiffened structure. Orthogrid refers to an orthometric (strength a right angles) grid-stiffened structure. Orthotropic refers to properties at right angles. PEEK refers to polyetheretherkeytone, a high-performance thermoplastic polymer. Section modulus refers to a geometric property for a given cross-sectional area that is important for the design of beams (or ribs) where the stiffness grows exponentially with the height. Specific strength refers to the strength of a material divided by its density. Specific stiffness refers to the stiffness (modulus) of a material divided by its density. Structural efficiency refers to the ratio of the load bearing ability of a structure to its weight. Syntactic foam refers to typically a polymer filled with HGM to reduce density. Prepreg refers to a generally continuous fiber reinforcement is preimpregnated with a matrix such as a polymer to form a composite tape.

The disclosed embodiments optimize the properties of grid-stiffened structures by using advanced composite surfaces with core materials and innovative manufacturing technologies. There are two basic manufacturing approaches, (1) molding and (2) AM, that achieve the same goal but are advantageous for different applications.

Materials:

Advanced Composite Materials: Composite materials are by definition the combination of two or more materials. Advanced composites are the combination of continuous fiber reinforcement and matrix which is typically a polymer. The graph of FIG. 1 in the '437 provisional application shows a comparison of specific strength and modulus of metals to unfilled polymer (PEEK or polyetheretherketone), chopped carbon fiber filled PEEK and continuous fiber reinforced PEEK (AS4 and IM7 are different grades of carbon fiber reinforcement).

As shown in the graph, continuous fiber reinforcement greatly increases the specific strength and stiffness of the structure. Continuous fiber rib caps do not need to be very thick and therefore minimize the issue of increased thickness at the nodes. However, the fibers can be cut and restarted at the nodes if desired but the reduced thickness of the rib caps and therefore the time and error rate penalty will be reduced. These are objects of the current invention.

Core Materials: This innovation involves the use of core materials, materials that fill the gap between the face sheet and the rib cap. The function of the core material is to transfer shear loads between face sheets in a sandwich structure or the face sheet and a rib cap in this innovation. In effect the core acts like the web in an I-beam, where the web provides the lightweight separator between the load-bearing flanges. In an I-beam the flanges carry the main tensile and compressive loads and so the web can be relatively lightweight. Core materials in a sandwich structure are ideally low in weight compared to the materials in the skin laminates.

Engineering theory shows that the flexural stiffness of sandwich laminates is approximately proportional to the square of its thickness. The purpose of a core in a composite material is therefore to increase the laminate's thickness by effectively thickening it with a low-density core material to increase the section modulus. This will result in a dramatic increase of stiffness for very little additional weight.

The key to this innovation is to efficiently manufacture lightweight grid-stiffened structures with lightweight core materials and a continuous fiber reinforced face sheet and rib cap. Core materials can be but are not limited to closed cell foam, syntactic foam, unfilled polymer and filled polymer (such as chopped fiber, nanotube, graphene, etc.).

Manufacturing Methods:

Overmolding: Composite overmolding is a relatively new technology that is being used to economically add features to composite structures. The general idea is to use an advanced composite face sheet for strength and stiffness, insert it into a mold and then form the thermoplastic polymer to create complex features (such as ribs) inexpensively. Injection molding is typically used for this purpose but other molding methods such as compression molding, transfer molding, resin transfer molding, etc. may be employed.

The size and shape of the structures is limited in overmolding due to tooling constraints. For example, closed sections or contoured sections make tooling removal after molding difficult or impossible. Such grid-stiffened shapes are typically machined from metal.

Additive Manufacturing: Additive manufacturing can be advantageously used to produce and/or add features to a composite structure. There are many different AM technologies that could be used but we will focus on extrusion processes such as filament based and pellet based for illustrative purposes. The illustration of FIG. 4 from the '437 provisional application shows the basic FFF process which feeds a filament through the extrusion head and polymer bead extrusion process which feeds polymer pellets into a screw extruder.

The continuous fiber face sheet and/or rib cap can be printed using a process called in-situ consolidation were continuous fiber reinforced thermoplastic tape such as prepreg is automatically dispensed and consolidated.

The continuous fiber face sheet can be printed or manufactured beforehand and inserted into the printer. The core material can then be extruded onto and bonded to the face sheet in grid patterns according to the design loads. A continuous fiber rib cap can then be printed onto the ribs to create a sandwich type structure in the ribs.

The additive manufacturing process described above is very versatile as it is able to manufacture grid-stiffened structures with complex shapes if robots with additional axes (more than traditional 3 axes) are used.

In one embodiment, the method for manufacturing a composite rib-stiffened structure comprises:
1) a composite face sheet comprising continuous reinforcing fiber in a polymer matrix;
2) a composite rib cap comprising continuous reinforcing fiber in a polymer matrix in the pattern of the rib stiffeners such that the fibers are oriented in the directions of the ribs; and
3) a polymer core that is injection molded between the face sheet and rib cap.

The core material can be a polymer foam and/or a syntactic foam, polymer or filled polymer. The continuous reinforcing fiber may comprise carbon fiber, glass fiber and/or any other suitable fiber.

In another embodiment, the method for manufacturing a composite rib-stiffened structure comprises:
1) a composite face sheet comprising continuous reinforcing fiber in a polymer matrix;
2) an extruded polymer core bonded onto the face sheet in the pattern of the rib stiffeners; and
3) a composite rib cap bonded to the polymer core comprising continuous reinforcing fiber in a polymer matrix such that the reinforcing fibers are oriented in the directions of the ribs.

The core material can be extruded using material extrusion additive manufacturing and bonded to the face sheet. The continuous fiber rib cap can be in-situ consolidated onto the core material. The core material can be a polymer foam a syntactic foam, polymer, filled polymer and/or any other suitable material. The continuous reinforcing fiber may comprise carbon fiber, glass fiber, and/or any other suitable fiber.

The resulting product or structure may have any desired shape and/or size. The structure may be of an arbitrary shape.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
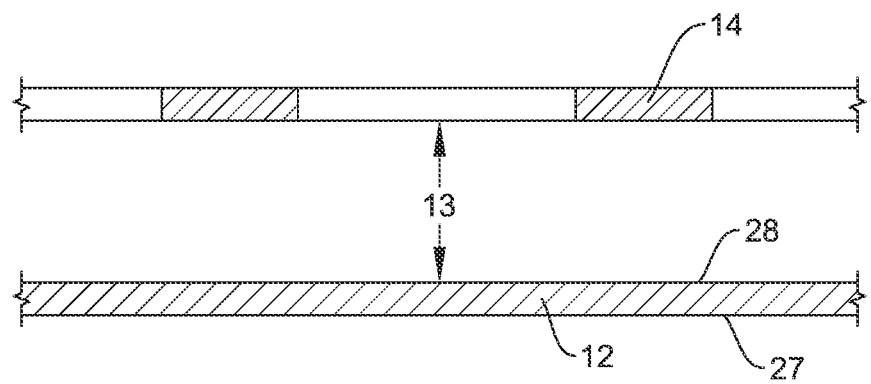
FIG. 1 is a sectional side view showing a first embodiment of a method of manufacturing a rib-stiffened composite structure having a composite face sheet and a composite rib cap.

FIG. 1 is a sectional side view of one embodiment of a method for manufacturing a rib-stiffened composite structure 10. FIG. 1 shows a composite face sheet 12 having a continuous reinforcing fiber in a polymer matrix. A distance away 13 and above the face sheet is positioned a composite rib cap 14 also having a continuous reinforcing fiber in a polymer matrix. As shown here and for any embodiments discussed herein, the continuous reinforcing fiber of the composite face sheet and/or composite rib cap may comprise carbon fiber and/or glass fiber.

Figure 5:
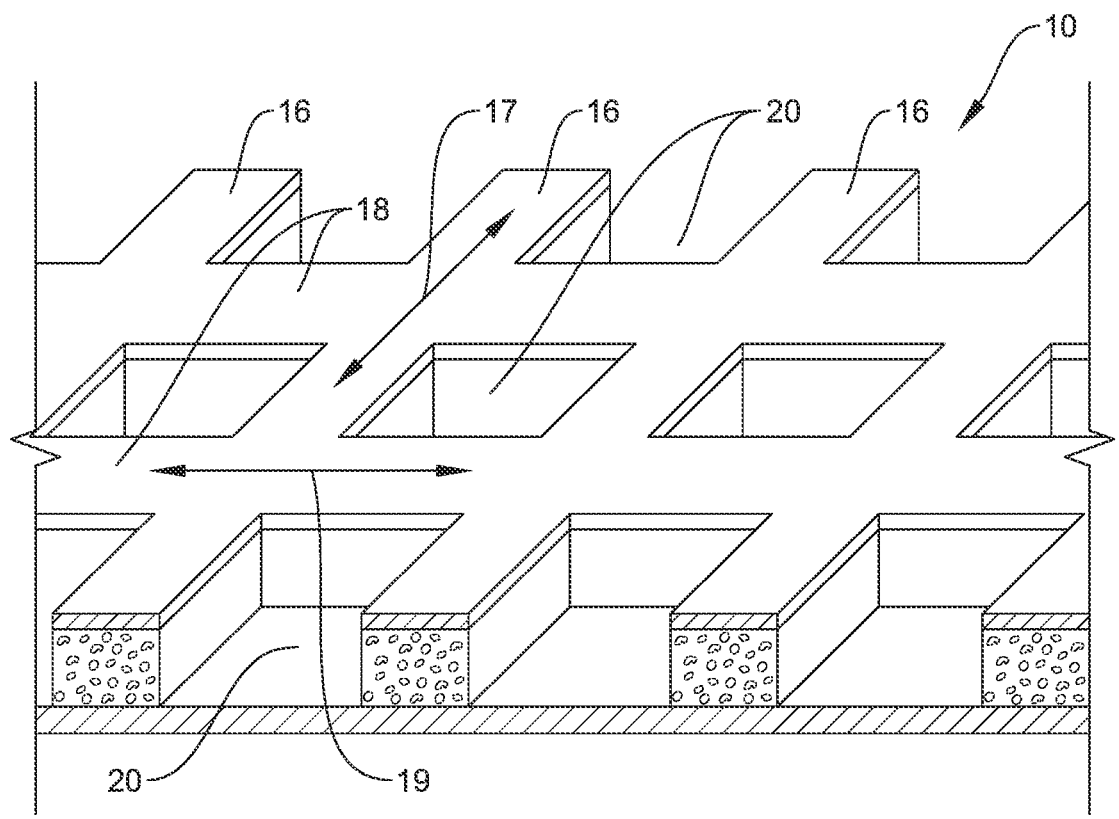
FIG. 5 is an isometric view of the structure of FIG. 4 illustrating an orthogrid type structure.

It is noted that the composite rib cap is formed in a grid pattern as may best be understood when looking at FIG. 5 which shows the completed rib-stiffened structure 10. Here, the grid pattern is a simplistic orthogrid, but it understood by those skilled in the art that any grid configuration could be used, including but not limited to, any number of parallel or non-parallel ribs running across any other number of parallel or non-parallel ribs. Here, as shown in FIG. 5, the grid pattern comprises a first series of parallel lines 16 crossing over a second series of parallel lines 18 wherein material voids 20 are formed in the spaces between the series of parallel lines. The lines have width, such that they may be also described as paths or sections. Also, as mentioned above, the lines may not be parallel to one another but at varying angles depending upon the structural needs of the overall assembly. Furthermore, the lines/paths may be curved and not following along a straight line.

The fibers of the continuous reinforcing fiber of the polymer matrix of the composite rib cap are oriented in a direction along the first and second series of parallel lines. This means for ribs 16 the fibers are running along direction 17 and for ribs 18 the fibers are running along direction 19.

Figure 2:
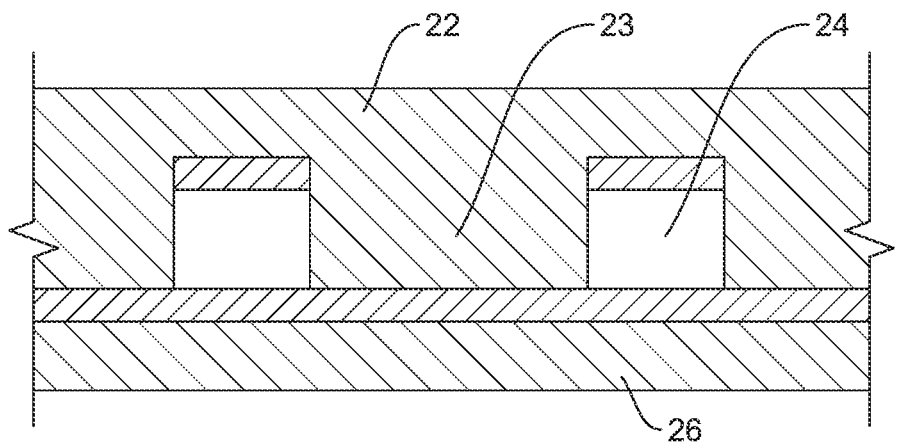
FIG. 2 is a continuation from FIG. 1 now showing a mold disposed over the face sheet and rib cap thus forming a molding chamber for the receival of an injection molded core.

FIG. 2 is similar to FIG. 1 but now shows a first mold 22 being positioned over the composite rib cap 14. As shown here, the composite face sheet 12 and rib cap 14 are disposed horizontally. However, it is noted that in actual use, it is likely they would be positioned vertically such that the first mold 22 could more easily capture the rib cap therein within. Accordingly, the use of the horizontally depicted images is for ease of understanding the differences between each step.

As shown in FIG. 2, the first mold secures the composite rib cap the distance 13 from the composite face sheet. The first mold extends through at portion 23 in the material voids of the composite rib cap and engages with the composite face sheet thereby forming a hollow space 24 between the composite face sheet and composite rib cap. Optionally, a second mold 26 can be placed on a backside 27 of the composite face sheet to provide additional structural support. (The backside 27 is opposite a frontside 28 of the face sheet 12 as best shown in FIG. 1.) The molds 22 and 26 can be made from steel, stainless steel, aluminum or any metal suitable for an injection molding process. Alternatively, even other composite structures or materials may be used to form the molds.

Figure 3:
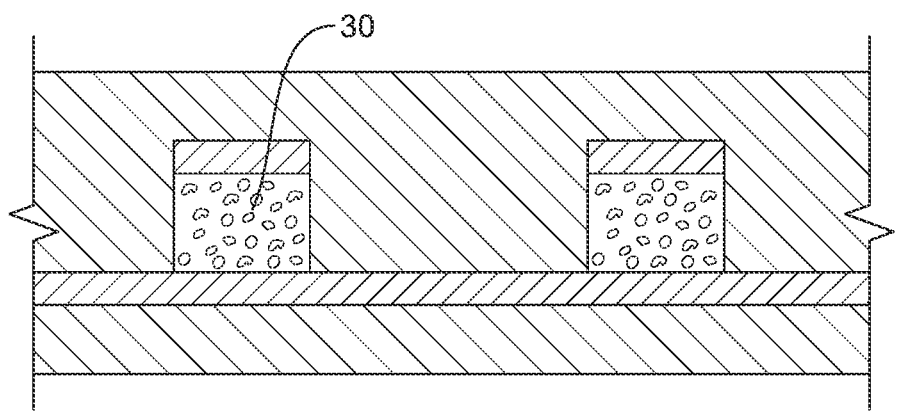
FIG. 3 is a continuation from FIG. 1 now showing the molded core between the face sheet and rib cap.

FIG. 3 shows injection molding a core material 30 into the hollow space 24 delimited by the frontside of the composite face sheet, the composite rib cap and the first mold. In the case of thermoplastic core materials the core material 30 would be hot and pressurized as it was being injected, but would then cool and bond to the composite face sheet and rib cap. In the case of thermoset core materials the resin would be cured, generally requiring heating, to bond to the face sheet and rib cap.

Figure 4:
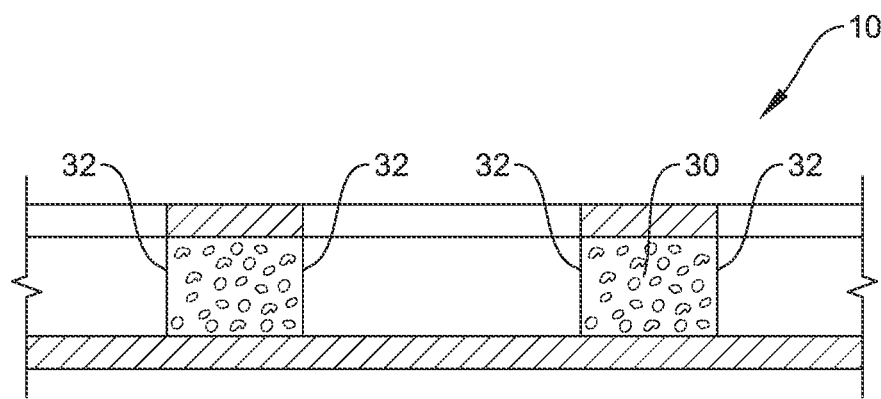
FIG. 4 is a continuation from FIG. 3 now showing the molds removed and revealing the completed structure of the rib-stiffened composite structure of FIGS. 1-3.

After cooling, the first mold and second molds are removed from the composite face sheet, composite rib cap and core material thereby resulting in the rib-stiffened composite structure as shown in FIG. 4.

As can be seen in FIGS. 4 and 5, the various side walls 32 of the core material are not covered by either the composite face sheet or the composite rib cap. This is important because it prevents the absorption of moisture between an encapsulated core, which can lead to delamination and failure of the structure.

It is also noted that the side walls of the core material and the sides 32 of the rib caps may be made a draft angle (0 degrees up to 45 degrees) to help in mold release. Typically, angles of 1 to 5 degrees are used. Additionally, the sidewalls of the molds themselves may be coated with a mold release compound which prevents the core material from bonding to the mold.

As shown here and for any embodiments discussed herein, the core material may be a polymer foam or a syntactic foam. Additionally, the core material may be a closed cell foam, an unfilled polymer, or a filled polymer where a filler can be but is not limited to a chopped fiber, a nanotube or graphene.

As can be seen from FIGS. 4 and 5, the composite face sheet, the composite rib cap and resulting rib-stiffened composite structure is planar. However, it is understood by those skilled in the art that these structures can be made to have one curve, two curves or any number of compound curves and features, such that the curves of the face sheet and rib caps match one another or don't match one another with varying heights of the material foam core. It is also understood by those skilled in the art that special tooling may be required for complex shapes so that the tooling can be removed. Such special tooling may be collapsible, washout, shape memory, or any other suitable means. It is the design objectives and structural requirements that will drive the various shapes needed for each application which can be used in accordance with the teaching disclosed herein.

Figure 6:
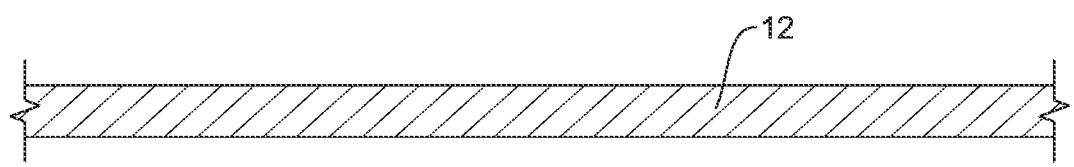
FIG. 6 is a sectional side view showing a second embodiment of a method of manufacturing a rib-stiffened composite structure starting with a composite face sheet.

FIG. 6 is a sectional side view of another embodiment of a method for manufacturing a rib-stiffened composite structure 10. FIG. 6 shows the starting point which is simply the composite face sheet 12 having a continuous reinforcing fiber in a polymer matrix.

Figure 7:
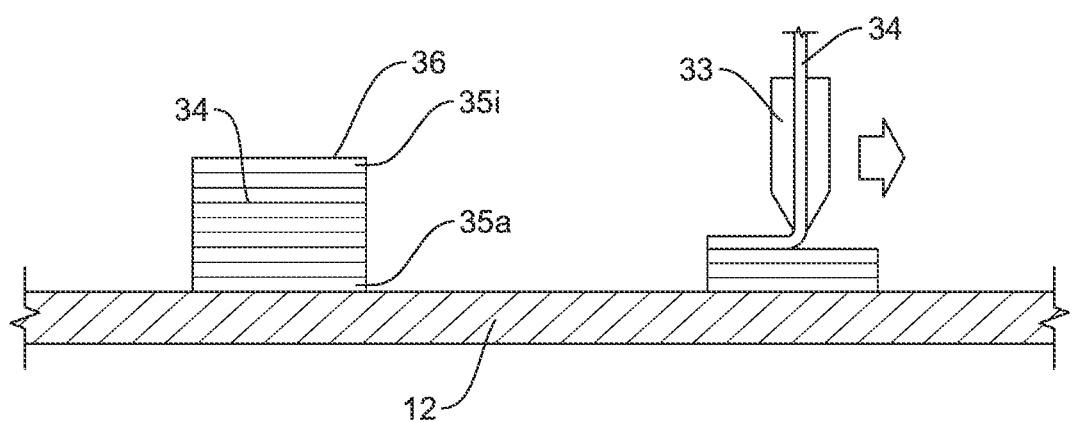
FIG. 7 is a continuation from FIG. 1 now showing a core material being dispensed in layers directly onto the face sheet thus forming the rib structure.

FIG. 7 shows an injector 33 depositing an extruded polymer core 34 in the grid pattern on the composite face sheet 12. As taught before, the grid pattern can comprise any number of parallel or non-parallel lines crossing over a second series of parallel or non-parallel lines wherein material voids are once again formed in the spaces between the series of lines/ribs. The extruded polymer core as shown here is deposited using a plurality of layers 35a-35i by fused-filament fabrication. It is understood by those skilled in the art that one layer or any "n" number of layers may be used to create such a core structure. It is also understood by those skilled in the art that other forms of additive manufacturing or traditional manufacturing may be used to create the core 34.

Figure 8:
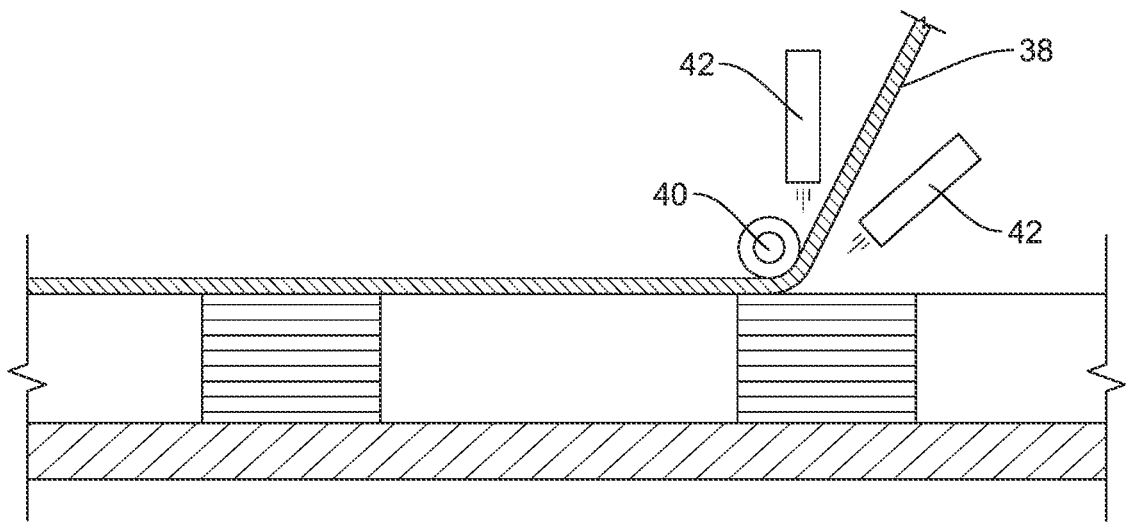
FIG. 8 is a continuation from FIG. 7 now showing a prepreg material being disposed directly onto the ribs to form the rib cap.

Once the core material 34 of the ribs are formed, FIG. 8 shows a representative means to deposit a composite rib-cap 12 upon an upper surface 36 of the extruded polymer core. Here, the in-situ consolidation process is used where a prepreg material 38 is automatically dispenses and consolidated by the use of a roller 40 and various heaters 42. It is understood that this depiction has been simplified for ease of understanding. The roller 40 may be one or any number and shape of rollers as needed. Likewise, the heater may be one or any number of types of heaters, such as heated air or directed light energy heaters.

Figure 9:
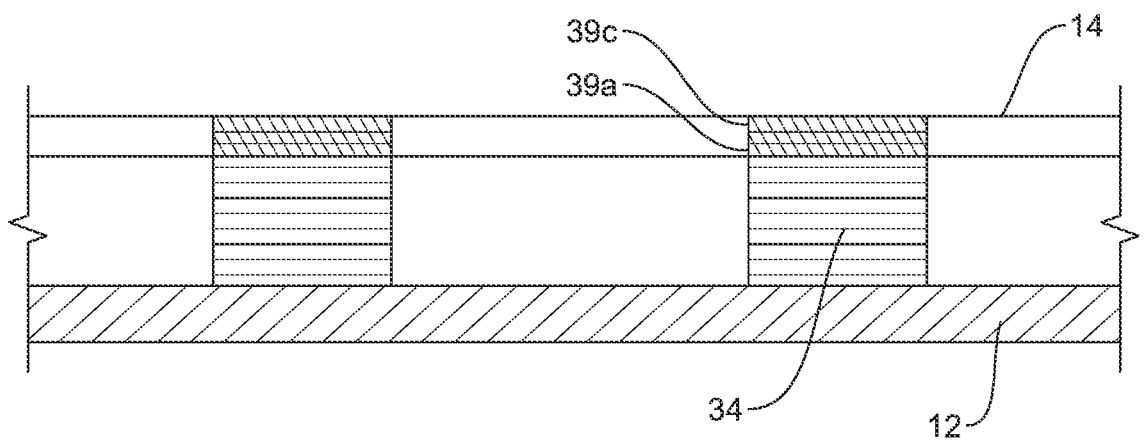
FIG. 9 is a continuation from FIG. 8 now revealing the completed structure of the rib-stiffened composite structure of FIGS. 6-8.

The deposition of the prepreg may be done with one layer or many layers 39a-39c as is shown completed in FIG. 9. Thus, it is understood by those skilled in the art that one or any "n" number of layers can be utilized.

Figure 10:
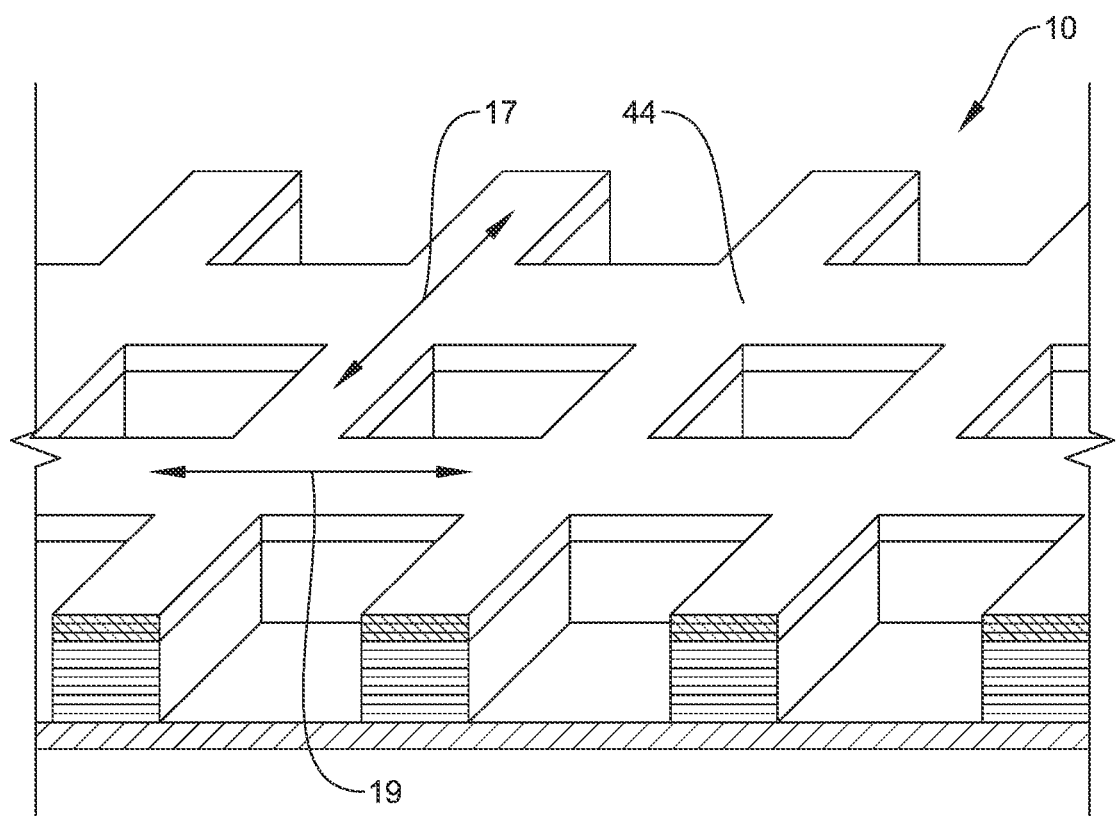
FIG. 10 is an isometric view of the structure of FIG. 9 illustrating an orthogrid type structure.
Figure 11A:
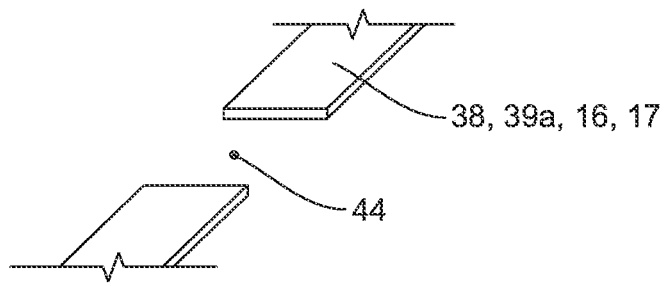
FIG. 11A is an isometric view of a rib cap being laid down in a first step with a segmented prepreg path.
Figure 11B:
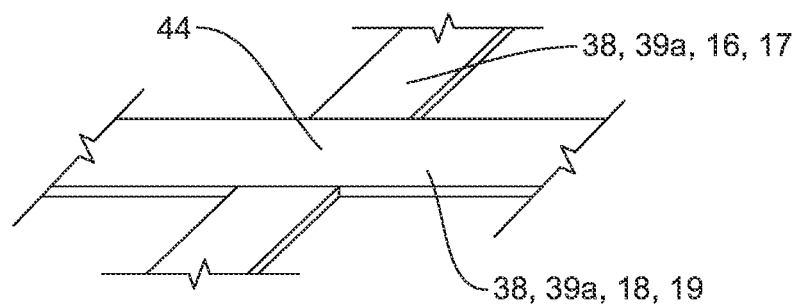
FIG. 11B is a continuation from FIG. 11A now showing a second step with a continuous prepreg path in a perpendicular direction.
Figure 11C:
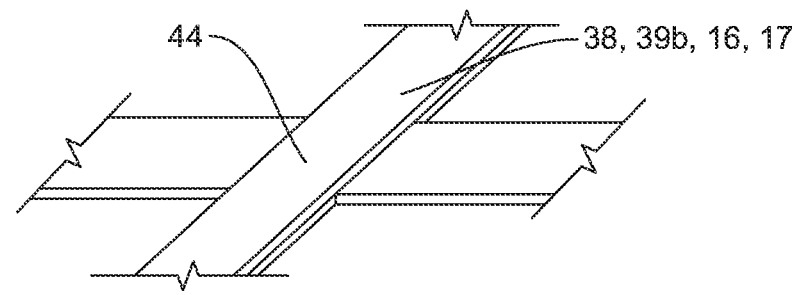
FIG. 11C is a continuation from FIG. 11B now showing a third step with a continuous prepreg path in another perpendicular direction.
Figure 11D:
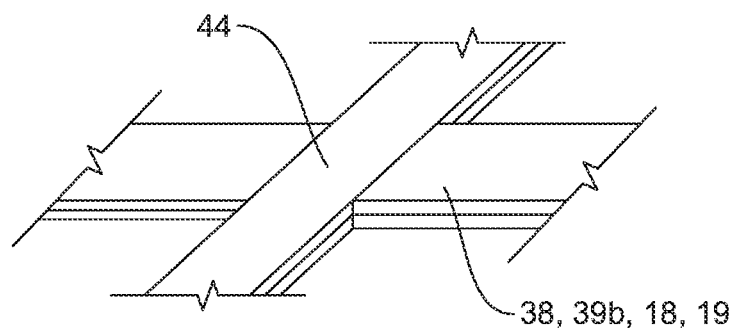
FIG. 11D is a continuation from FIG. 11C now showing a fourth step with a segmented prepreg path in another perpendicular direction resulting in a uniform path thickness throughout the grid pattern.

Furthermore, as best shown in FIG. 10, the fibers of the continuous reinforcing fiber of the polymer matrix of the composite rib cap are oriented in a direction along the first and second series of parallel lines of the grid pattern of the extruded polymer core as taught previously. This is done by laying the prepreg along the direction 17 and then also laying it along the direction 19. There will be overlap at the nodes 44 of the ribs, where the prepreg in direction 17 overlaps the prepreg in the direction 19. However, the prepreg thickness is relatively thin such that any buildup of overlap does not then become undesirably thick and wasteful.

In regards to FIGS. 11A-11D, in the case of thick rib caps 14 at the junction 44 or where a uniform rib height is needed, every other layer of rib cap prepreg 39n can be cut and restarted at the node as previously stated. For example, when prepreg is being laid down in the direction 17 in FIG. 11A, it may be stopped and started so no prepreg is disposed on or at the junction 44. Then, in FIG. 11B prepreg can be laid down in direction 19 that goes through the junction 44. Next in FIG. 11C, when prepreg is again laid down in direction 17 it does not stop and start at junction 44 but instead is laid down through junction 44. Next IN FIG. 11D, prepreg is laid down in direction 19 but stops and starts at junction 44. In this manner, the process can be repeated again and again such that junction 44 never becomes overly thick in comparison to the rest of the path along the directions 17 and 19. Accordingly, each junction has alternating continuous prepreg layers of the first series and second series of paths forming a junction of similar thickness to the rest of the first and second series of paths.

For all embodiments taught herein, to aid in bonding between the composite face sheet and rib cap to then the core material of the ribs, the polymer used in the polymer matrix of the face sheet and rib cap can be the same or compatible polymer used in the core material. This provides homogeneity between the material properties of the rib-stiffened composite structure to then prevent delamination and other various mismatches of coefficients of thermal expansion.

Although several embodiments have been described in detail for purposes of illustration, various modifications may be made to each without departing from the scope and spirit of the invention. Accordingly, the invention is not to be limited, except as by the appended claims.

NUMERALS 10 rib-stiffened composite structure
12 composite face sheet
13 distance
14 composite rib cap
15 grid pattern
16 first series of parallel lines/paths/ribs
17 fiber direction, first series or ribs
18 second series of parallel lines/paths/ribs
19 fiber direction, second series of ribs
20 voids between ribs
22 first mold
23 portion, first mold
24 hollow space
26 second mold
27 backside of composite face sheet
28 frontside of composite face sheet
30 core material
32 side walls, core material
33 injector
34 extruded polymer core material
35a-i layers of extruded polymer core
36 upper surface of extruded polymer core
38 prepreg material
39a-c layers of prepreg material
40 roller
42 heater or heaters
44 rib cap junction/nodes

What is claimed is:

1. A rib-stiffened composite structure, comprising:
a composite face sheet having a continuous reinforcing fiber in a polymer matrix;

a polymer core in a grid pattern directly disposed on the composite face sheet, the grid pattern comprising a first series of paths crossing over a second series of paths wherein material voids are formed in the spaces between the first and second series of paths; and a composite rib-cap directly disposed upon an upper surface of the polymer core, the composite rib-cap comprising a continuous reinforcing fiber in a polymer matrix, wherein fibers of the continuous reinforcing fiber in the polymer matrix of the composite rib-cap are oriented in a direction along the first and second series of paths of the grid pattern of the polymer core.

2. The rib-stiffened composite structure of claim 1, wherein the polymer used in the polymer matrix of the composite face sheet and the composite rib-cap is the same polymer used in the polymer core.

3. The rib-stiffened composite structure of claim 1, wherein a side wall of the polymer core is not covered by either the composite face sheet or the composite rib-cap.

4. The rib-stiffened composite structure of claim 1, wherein the core material is a polymer foam, a syntactic foam, a closed cell foam, an unfilled polymer, or a filled polymer comprising a filler, wherein the filler is a chopped fiber, a nanotube or graphene.

5. The rib-stiffened composite structure of claim 1, wherein the continuous reinforcing fiber of the composite face sheet and/or the continuous reinforcing fiber of the composite rib-cap comprises carbon fiber and/or glass fiber.

6. The rib-stiffened composite structure of claim 1, wherein the composite face sheet is planar and/or the composite rib-cap is planar.

7. The rib-stiffened composite structure of claim 1, wherein the composite face sheet comprises at least one curve.

8. The rib-stiffened composite structure of claim 7, wherein the composite rib-cap comprises a second curve, wherein a shape of the second curve is the same as a shape of the at least one curve of the composite face sheet.

9. The rib-stiffened composite structure of claim 1, wherein the polymer core does not comprise a plurality of material voids disposed within the first and the second series of paths.

10. The rib-stiffened composite structure of claim 1, wherein the composite face sheet does not have material voids matching the material voids formed in the grid pattern of the polymer core.

11. The rib-stiffened composite structure of claim 10, wherein the composite rib-cap does have material voids matching the material voids formed in the grid pattern of the polymer core.

12. The rib-stiffened composite structure of claim 1, where the rib-stiffened composite structure is made by a method comprising the following steps:
forming the composite face sheet;
forming the composite rib cap;
wherein fibers of the continuous reinforcing fiber of the polymer matrix of the composite rib cap are oriented in a direction along the first and second series of paths;
providing a first mold securing the composite rib cap a distance from the composite face sheet, the first mold extending through the material voids of the composite rib cap and engaging with the composite face sheet forming a hollow space between the composite face sheet and composite rib cap;
injecting a core material into the hollow space delimited by the composite face sheet, the composite rib cap and the first mold; and
removing the first mold from the composite face sheet, composite rib cap and core material thereby resulting in the rib-stiffened composite structure.

13. The rib-stiffened composite structure of claim 12, wherein the injection of the core material into the hollow space delimited by the composite face sheet, the composite rib cap and the first mold comprises injection molding, compression molding, transfer molding or resin transfer molding.

14. The rib-stiffened composite structure of claim 1, where the rib- stiffened composite structure is made by a method comprising the following steps:
forming the composite face sheet;
depositing the extruded polymer core in the grid pattern on the composite face sheet, wherein the extruded polymer core is deposited using a plurality of layers by a material extrusion process; and
depositing the composite rib-cap upon an upper surface of the extruded polymer core, wherein fibers of the continuous reinforcing fiber of the polymer matrix of the composite rib cap are oriented in a direction along the first and second series of paths of the grid pattern of the extruded polymer core.

15. The rib-stiffened composite structure of claim 14, wherein the first series of paths crossing over the second series of paths define junctions, where each junction has alternating continuous prepreg layers of the first series and second series of paths forming a junction of similar thickness to the rest of the first and second series of paths.

* * * * *